(12) United States Patent
Outram et al.

(10) Patent No.: US 12,366,065 B2
(45) Date of Patent: *Jul. 22, 2025

(54) FIRE-STOPPING PRODUCT

(71) Applicants: tremco illbruck Limited, Wigan (GB); tremco illbruck GmbH, Bodenwöhr (DE)

(72) Inventors: Ian Outram, Crayford (GB); Simon Jones, Coventry (GB); Andrew Taylor, Wigan (GB); Walter Geyer, Schwandorf (DE); Markus Komma, Burglengenfeld (DE); Michael Pronold, Guteneck (DE)

(73) Assignees: TREMCO ILLBRUCK LIMITED, Greater Manchester (GB); TREMCO ILLBRUCK GMBH, Bodenwohr (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,199

(22) Filed: Feb. 6, 2023

(65) Prior Publication Data
US 2023/0175252 A1    Jun. 8, 2023

Related U.S. Application Data

(63) Continuation of application No. 16/300,099, filed as application No. PCT/EP2017/061093 on May 9, 2017, now Pat. No. 11,598,088.

(30) Foreign Application Priority Data

May 9, 2016    (DE) .......................... 102016108538.3

(51) Int. Cl.
*E04B 1/94*        (2006.01)
*A62C 2/06*        (2006.01)
(Continued)

(52) U.S. Cl.
CPC .............. *E04B 1/947* (2013.01); *A62C 2/065* (2013.01); *C08J 9/42* (2013.01); *C08L 75/04* (2013.01);
(Continued)

(58) Field of Classification Search
CPC ... A62C 2/065; C08J 2205/06; C08J 2375/04; C08J 2433/00; C08J 9/42;
(Continued)

(56) References Cited

U.S. PATENT DOCUMENTS 3,934,066 A    1/1976  Murch
4,302,917 A   12/1981  Fermvik et al.
(Continued)

FOREIGN PATENT DOCUMENTS

EP    0332928 A2    9/1989
EP    0706979 A1    4/1996
(Continued)

OTHER PUBLICATIONS

PCT International Search Report, PCT/EP2017/061093, mailed Dec. 18, 2017 (6 pages).
(Continued)

*Primary Examiner* — Hai Vo
(74) *Attorney, Agent, or Firm* — Honigman LLP; Eric J. Sosenko; Jonathan P. O'Brien

(57) ABSTRACT

A fire-stopping material in a panel for an interior building wall is provided. The fire-stopping material includes a resilient, porous material at least partially impregnated with an intumescent agent.

19 Claims, 4 Drawing Sheets

(51) Int. Cl.
*C08J 9/42* (2006.01)
*C08L 75/04* (2006.01)
*C09K 3/10* (2006.01)
*C09K 21/02* (2006.01)
*C09K 21/04* (2006.01)
*E06B 1/62* (2006.01)
*E06B 5/16* (2006.01)

(52) U.S. Cl.
CPC .............. *C09K 21/02* (2013.01); *C09K 21/04* (2013.01); *E04B 1/942* (2013.01); *E04B 1/946* (2013.01); *E04B 1/948* (2013.01); *C08J 2205/06* (2013.01); *C08J 2375/04* (2013.01); *C08J 2433/00* (2013.01); *C08L 2201/02* (2013.01); *C08L 2203/14* (2013.01); *C09K 2003/1037* (2013.01); *C09K 2003/1053* (2013.01); *E06B 2001/626* (2013.01); *E06B 5/164* (2013.01)

(58) Field of Classification Search
CPC ........... H01L 2224/10126; H01L 24/02; H01L 2924/01004; H01L 2924/01005; H01L 2924/01006; H01L 2924/01013; H01L 2924/01014; H01L 2924/01033; H01L 2924/13091; H01L 2924/00; C08L 2201/02; C08L 2203/14; C08L 75/04; C09K 2003/1037; C09K 2003/1053; C09K 21/02; C09K 21/04; E04B 1/942; E04B 1/946; E04B 1/947; E04B 1/948; E06B 2001/626; E06B 5/164
See application file for complete search history.

(56) References Cited

U.S. PATENT DOCUMENTS

| | | | |
|---|---|---|---|
| 6,065,259 A | 5/2000 | Clear | |
| 6,182,407 B1 | 2/2001 | Turpin et al. | |
| 7,607,272 B1 | 10/2009 | Woolworth | |
| 9,097,011 B1 | 8/2015 | Barone et al. | |
| 11,555,306 B2 * | 1/2023 | Pullinger | E04F 13/0875 |
| 11,598,088 B2 * | 3/2023 | Outram | E04B 1/942 |
| 2005/0176833 A1 | 8/2005 | Tay | |
| 2006/0288653 A1 * | 12/2006 | Mimnaugh | E06B 7/28 52/209 |
| 2008/0193738 A1 * | 8/2008 | Hensley | C08J 9/42 427/181 |
| 2009/0197060 A1 | 8/2009 | Cho | |
| 2012/0022176 A1 | 1/2012 | Stahl et al. | |
| 2012/0121805 A1 | 5/2012 | Fishback et al. | |
| 2013/0118764 A1 | 5/2013 | Porter | |
| 2014/0360118 A1 | 12/2014 | Hensley et al. | |

FOREIGN PATENT DOCUMENTS

| | | | | |
|---|---|---|---|---|
| EP | 1842957 | A1 | 10/2007 | |
| GB | 2403741 | A | 1/2005 | |
| JP | 852-063736 | U | 5/1977 | |
| JP | H02-067190 | U | 3/1990 | |
| JP | 2001-254454 | A | 9/2001 | |
| JP | 2016-023432 | A1 | 2/2016 | |
| WO | 0052278 | A1 | 9/2000 | |
| WO | WO-2010096022 | A1 * | 8/2010 | ............... E06B 5/16 |
| WO | 2016058026 | A1 | 4/2016 | |

OTHER PUBLICATIONS

Hilti Deutschland Ag: "Technisches Handbuch Brandshutzsysteme", 2013, p. 31 retrieved from the Internet: URL:https:/www.hilti.de/medias/sys_master/documents/h41/9108117815326/ASSET_DOC_LOC_2584387_APC_RAW.pdf, retrieved on Dec. 8, 2017).

Hilti: "Technisches DatenblatXP055708894, Retrieved from the Internet: URL:https://www.hilti.de/media-canonical/ASSET DOC LOC 1818897 A PC RAW/CFS-BL°/020P°/020Montageanleitung [retrieved on Jun. 25, 2020]".

Europaische Technische Bewertung: ""Technisches Datenblatt Hilti Brandschutz-modulbox CFS-MB", Aug. 1, 2014 (Aug. 1, 2014), Retrieved from the Internet: URL:https://www.hilti.de/medias/sys_master/documents/ hl 2/9212797714462/Technisches-Datenblatt-CFS-MB-Technische-Information-ASSET-DOC-LOC-7100597. pdf [retrieved on Sep. 25, 2020]".

* cited by examiner

FIRE-STOPPING PRODUCT

CROSS-REFERENCE TO RELATED APPLICATIONS

This application is a continuation of U.S. patent application Ser. No. 16/300,099, filed Nov. 9, 2018, which the U.S. national stage of International (PCT) Application No. PCT/EP2017/061093, filed May 9, 2017, which claims the benefit of priority to German Patent Application No. 10 2016 108 538.3, filed May 9, 2016, the entire contents of each of which are herein incorporated by reference in their entireties.

FIELD OF THE INVENTION

The present invention relates to making good the fireproofing of an interior dividing wall when provided with a penetration such as that made by a cable, conduit or pipe that passes through the wall.

BACKGROUND

Fire stopping in the context of the present invention is concerned with maintaining separate compartments in a structure in case of fire. The compartments should be sealed off from each other with respect to smoke, heat and flames, in order to give more time for the people in the areas not affected by fire to escape the building before the fire spreads.

Fire stopping products are provided to seal gaps between compartments, both gaps between building elements (floors, walls, roofs) and gaps within building elements such as penetrations for conduits, pipes or cables, and the spaces between doors and their frames.

Conventionally, there are two kinds of technologies. Passive technologies such as sealants, mastics and fire batts are permanently resistant to fire and are designed to resist fire conditions without change. Reactive technologies such as intumescent tapes or pipe collars are designed to expand when heated in the same manner as intumescent coatings, and fill gaps which would normally be open in the non-fire situation.

The present invention is concerned with reactive technologies implemented in dividing interior walls.

Dividing interior walls between fire compartments are often made from two sheets of plasterboard sandwiching a slab of fire proof insulation.

When service penetrations (for cables and pipes) are made in these types of wall, the installer has to drill through the plasterboard and insulation, remove the insulation material and fit some kind of complex fire-proofing solution, for example pipe collars, bands, batts and/or mastic. The particular type of fire-stopping to be fitted will depend upon the exact nature of the penetration, and a single job might require more than one type. The hole must be made fire and smoke proof, and where the penetration is combustible or melts in a fire, the solution chosen must also close the hole left when the penetration burns or melts during a fire.

Batts are incombustible boards made from mineral wool fibre coated with mastic as a smoke barrier. They are typically supplied in standard sizes then cut to suitable size and shape on site. Mastics and sealants may be intumescent or just fire-resistant without intumescence.

For more complex applications where intumescent closure is needed, mechanical solutions may be used. A cable sleeve, for example, is a steel shell lined with intumescent material. This is placed into a hole cut in the wall, and cables and/or pipes are fed through. Often, secondary sealing methods are used in conjunction so that the whole assembly is fire and smoke-proof.

Pre-shaped pillows are filled with a soft mixture of fibres and intumescent materials and simply stuffed around the penetrations. Pre-shaped blocks of foam may also be used.

Therefore there exists a need for a simplified fire-stopping product for internal walls that is easy to use with a variety of service penetrations, without the need for a number of different fire-proofing solutions to make good the fire-proofing of an internal wall when a service penetration is made.

SUMMARY

The invention provides a fire-stopping material for use in a sandwich panel for an internal wall, the fire-stopping material comprising a resilient, porous material at least partially impregnated with an intumescent agent.

In some embodiments, the fire-stopping material may be in the form of a strip with an elongate support.

Preferably, the resilient, porous material comprises a foam, a non-woven fabric and/or a fibrous body and is provided with an impregnating agent comprising the intumescent agent.

Preferably, the impregnating agent comprises at least one liquid medium and a binder for binding solid components of the impregnating agent to the foam material and wherein the intumescent agent comprises expandable graphite. The binder preferably helps the intumescent agent, such as graphite, to remain evenly dispersed within the pores of the resilient, porous material after it is impregnated into the resilient, porous material.

Preferably, the binder is an acrylic binder. Acrylic binders may be preferred because they exhibit good adhesion, water resistance and resistance to degradation.

Preferably, the impregnating agent comprises a phosphorus-containing compound.

Preferably, the phosphorous-containing compound is a phosphate, preferably a polyphosphate.

Preferably, the polyphosphate is ammonium polyphosphate.

Preferably, the impregnating agent comprises both a phosphorous-containing compound and graphite. Phosphates are known to have a synergistic effect with expandable graphite, producing a char that is less susceptible to erosion and detachment from the substrate in fire conditions. Polyphosphates, in particular ammonium polyphosphate, are preferred.

Preferably, the resilient, porous material has a porosity of 10-100 pores per lineal inch (ppi), preferably 20-80 ppi.

The resilient, porous material is preferably produced from a foam material. In addition the resilient, porous material can also be made up of a plurality of materials such as for instance a foam material, a non-woven fabric and/or a fibrous material.

Preferably, the liquid medium is water or it contains water. In addition, however, the liquid medium may also be a liquid solvent or a mixture of water and a liquid solvent. The solvent may preferably be an organic solvent.

Preferably, the fibrous material is a body, in particular a planar body such as in particular, but not exclusively, mats and/or plates and/or strips. In this case these bodies can be made from a material which is selected from a group of materials containing mineral fibres, glass fibres, plastic fibres, natural fibres, combinations thereof or the like. If as the material a fleece is used, then this fleece comprises a material thickness, which is sufficiently large so that the fleece comprises a predefined resilience.

In this case it is conceivable that these bodies are made completely from these fibre materials, but it would also be conceivable that, in addition to the fibre materials, other substances are also present, such as in particular, but not exclusively, binders, aggregate materials and the like.

In a further preferred embodiment the fibrous material is at least partially resilient. Preferably the resilience of the material is such that, when given a predefined compression, especially a compression to 50% of the original thickness, it resets at least partially, preferably to at least 60% of the original thickness, preferably to at least 70% of the original thickness, preferably to at least 75% of the original thickness and very preferably to at least 80% of the original thickness. These data refer especially to the not yet impregnated material.

In general the carrier is preferably resilient and/or elastic.

Preferably, the resilient, porous material is a reticulated foam material, preferably a reticulated PU soft foam. Where the resilient, porous material is a foam, preferably is has a porosity of 10-100 pores per lineal inch (ppi), preferably 20-80 ppi.

Preferably, the porous, flexible material comprises a foam, wherein the foam has a cell size between 2000 µm and 7000 µm, preferably between 3000 µm and 6000 µm and particularly preferably between 3400 µm and 5600 µm.

Preferably, the impregnating agent has a proportion of water of between 40 and 60 parts per hundred parts, and/or a proportion of binder of between 25 and 35 parts and/or a proportion of expandable graphite of between 15 and 25 parts.

Preferably, the liquid medium is water or contains water and/or the liquid medium contains solvent and in particular organic solvent.

The impregnating agent is preferably dried once impregnated into the porous, flexible material such that there is no significant liquid content remaining in the finished product, only traces may remain.

The invention also provides a panel for an internal building wall comprising two parallel boards defining a gap, wherein the gap is filled by insulation comprising a fire-stopping material, wherein the fire-stopping material comprises a resilient, porous material at least partially impregnated with an intumescent agent.

The invention also provides an internal building wall comprising two parallel boards defining a gap, wherein a fire-stopping material fills the gap, and wherein the fire-stopping material comprises a resilient, porous material impregnated with an intumescent agent.

Preferably in the panel or wall the insulation consists of the fire-stopping material. The fire-stopping material of the invention may obviate the need for an additional layer of fire-proof insulation. However, the fire-stopping material of the invention may also be used in conjunction with a slab of insulation between the two boards.

Preferably the intumescent agent includes at least one of: graphite, polyphosphate, melamine, pentaerythritol, titanium dioxide and exfoliated vermiculite. Any suitable intumescent agent may be used. In the event of a fire, the intumescent agent will swell and undergo a chemical and/or physical transformation to form a barrier that will block hot gases and flames for a period of time long enough to allow building occupants to escape to safety.

Preferably, the intumescent agent comprises graphite. When exposed to hot gases, graphite intumesces to form a char that blocks the spread of hot gases and flames for a period of time. Graphite is particularly preferred because it intumesces quickly and at relatively low temperatures.

Preferably, the intumescent agent comprises graphite and ammonium polyphosphate. Addition of ammonium polyphosphate (APP) may improve the resistance of the char to erosion by flames and detachment from the substrate under fire conditions.

Preferably, the resilient, porous material comprises an open-cell foam or a non-woven material. In either case, the resilient, porous material allows hot gases from a fire to contact the intumescent agent so that it may intumesce without delay in the event of a fire.

Preferably, the resilient, porous material comprises a polyurethane (PU) open-cell foam. Where the resilient, porous material is a PU open-cell foam, preferably is has a porosity of 10-100 pores per lineal inch (ppi), preferably 20-80 ppi.

Preferably, the weight ratio of the resilient, porous material to the intumescent agent is from 1:0.2 to 1:6, preferably from 1:1 to 1:3.

Preferably, at least one major face of the fire-stopping material comprises a smoke-impermeable coating. Whilst the fire-stopping material helps to prevent, for a period of time, the spread of a fire, the smoke-impermeable coating helps to prevent or reduce the dispersion of smoke through internal building walls. The smoke-impermeable coating may be any suitable smoke barrier, such as a mastic, a metal foil, or another impermeable material, preferably an acrylic mastic.

Preferably, one or both of the boards is a plasterboard. Plasterboards are suitable for internal sandwich-type walls and wall panels.

A penetration can be made at any point in such a panel by simply cutting away the plasterboard, slitting the fire-stopping material and pushing the pipe or cable through. The smoke seal can then be reinstated by applying mastic to fill back to the plasterboard edges. The complex solutions to restoring smoke seals from the prior art are not necessary with the implementation of the present invention.

Accordingly, the invention also provides a method of providing a service penetration through an internal building wall comprising the steps:

providing an internal building wall wherein at least a part of the wall comprises two boards and a fire-stopping material disposed between the boards, wherein the fire-stopping material comprises a resilient, porous material impregnated with an intumescent agent;

cutting away the boards in the location of the service penetration thereby exposing the fire-stopping material;

slitting the exposed fire-stopping material;

pushing a service element through the fire-stopping material to cross from one side of the wall to the other;

applying a mastic or other filler to fill back to the board edges.

This is an easy, universal solution. The installer only has to carry tools and mastic, rather than a selection of complex mechanical fire stopping products.

Embodiments of the invention will now be described in more detail with reference to the drawings.

DETAILED DESCRIPTION

Figure 1:
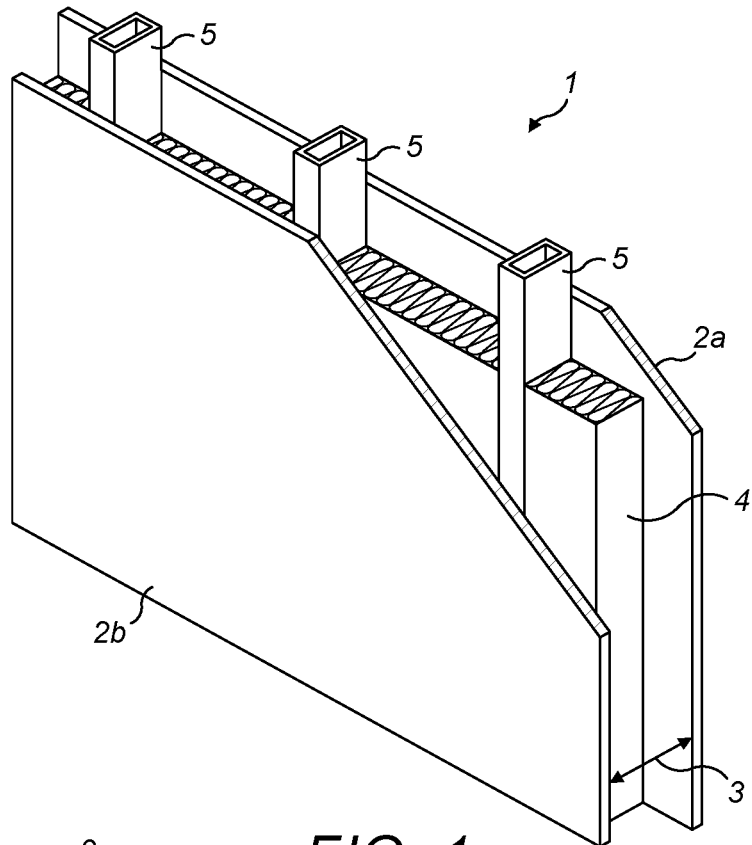
FIG. 1 shows a typical fire-rated dividing interior wall.

FIG. 1 shows a typical construction of an interior wall 1 of the sandwich panel type, in this drawing specifically a steel stud wall. Two substantially parallel boards 2a, 2b defined a cavity 3, within which is disposed a slab of insulation 4. The insulation 4 is preferably fire-proof. The boards 2a, 2b may be, for example, gypsum, fibre cement, plasterboard, or any other suitable board type and may be fire-rated in their own right. Also shown in FIG. 1 are steel tubes 5, which act as a framework for the insulation and plaster boards, providing structural support. Shapes other than tubes; such as U-sections, H-sections or L-sections, are also possible and they may be perforated. According to the present invention, the fire-stopping product may be provided either in addition to or in replacement of the insulation slab 4 within the cavity 3.

Frequently, it is necessary to make a penetration through an internal wall, for example to pass through a pipe, cable, or other service as required. The prior art provides various and often complex solutions to making good the fire-proofing of the internal wall, so that the service penetration does not facilitate the fast spreading of a fire. FIGS. 2 to 5 show examples of prior art solutions to restoring the fire barrier after installing a service penetration.

Figure 2:
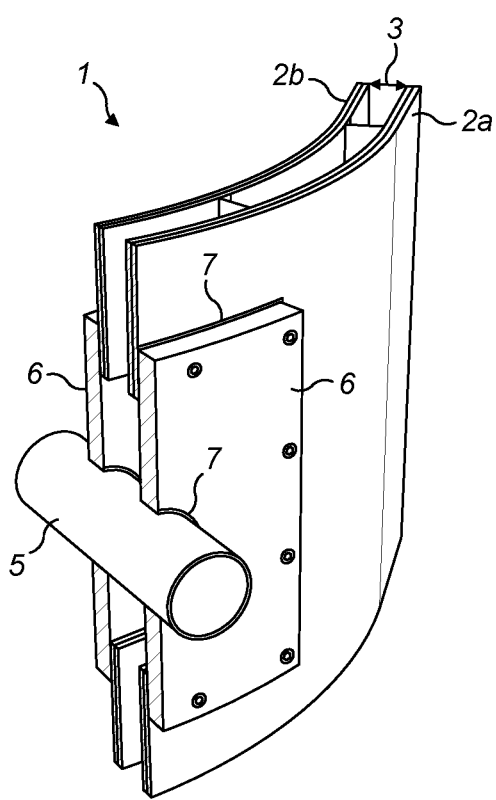
FIG. 2 shows a prior art solution to make a service penetration fire- and smoke-proof by using batts and mastic.
Figure 3:
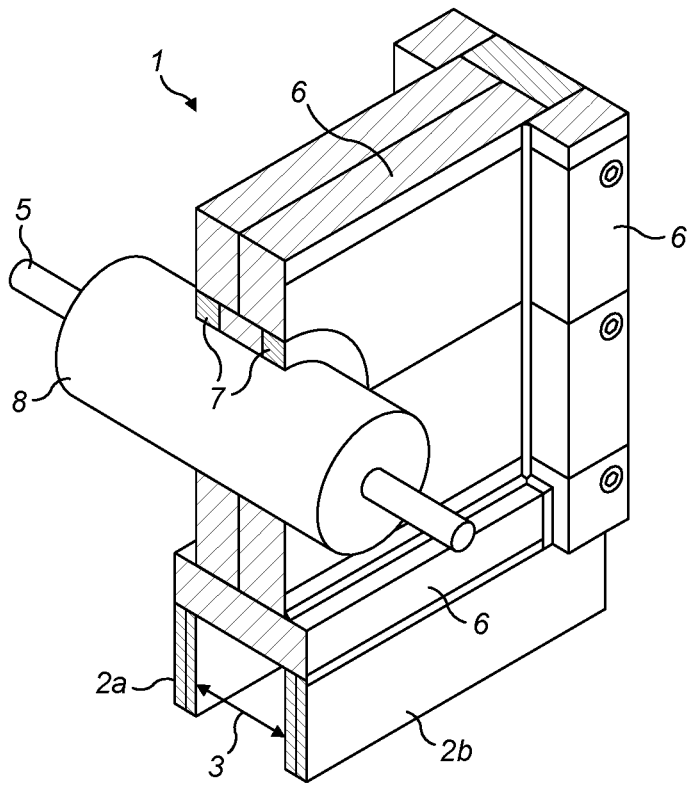
FIG. 3 shows a prior art solution to make a service penetration fire- and smoke-proof by using batts and mastic.

FIGS. 2 and 3 show a solution using batts and mastic. The area of the boards 2a, 2b surrounding the service penetration 5 is surrounded by batts 6 and the system is sealed using mastic 7. In FIG. 3, the service penetration 5 is wrapped in a layer of combustible insulation 8. Batts are incombustible boards made from mineral wool fibre coated with mastic as smoke barrier. They are typically supplied in standard sizes then cut to suitable size and shape on site. Mastics and sealants may be intumescent or just fire-resistant without intumescence.

Figure 4:
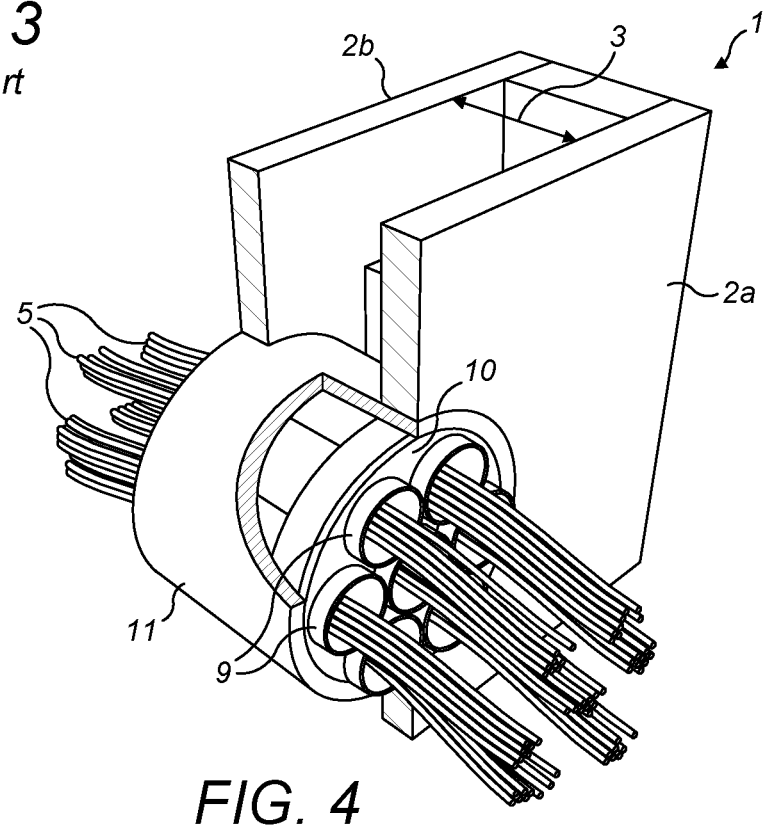
FIG. 4 shows a prior art solution to make a service penetration fire- and smoke-proof by using sleeves and wraps.

FIG. 4 shows a complex prior art solution where intumescent closure is needed. A cable sleeve 11, e.g. a steel shell lined with intumescent material, is placed into a hole cut into the wall 1 through both boards 2a, 2b. Cables and/or pipes 5 are fed through the sleeve 11. The steel shell of the cable sleeve 11 means that the intumescent material within (from additional sealing means such as PVC tubes 9 that are filled inside with mastic and a piece 10 cut from a batt) can only expand inwards to fill the gaps around the service penetrations 5, rather than into the dry wall cavity 3. As is clear from this example, various components are required, which is inconvenient and costly.

Figure 5:
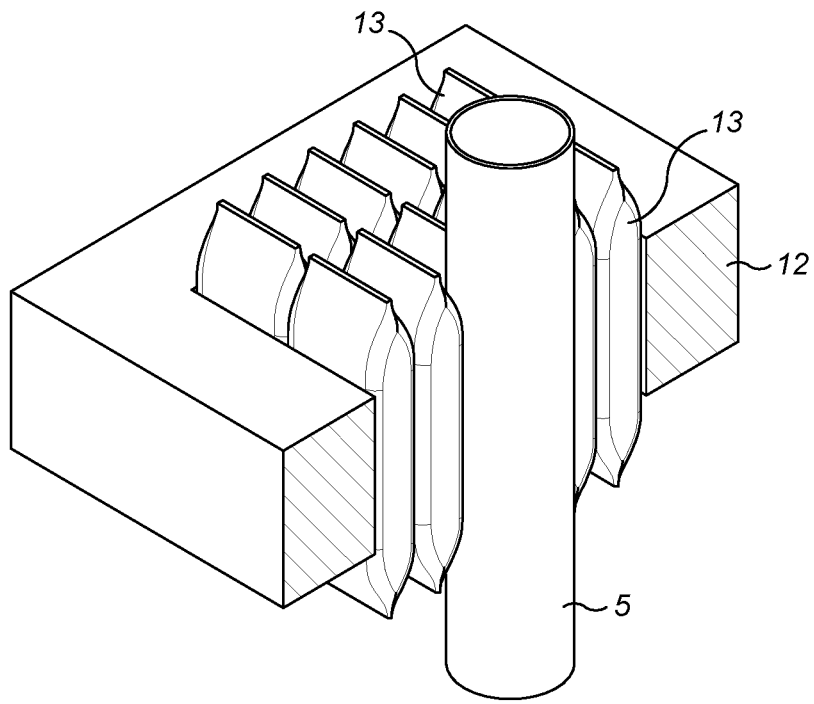
FIG. 5 shows a prior art solution to make a service penetration fire- and smoke-proof by using pillows.

FIG. 5 shows an example of how restoring fire-proofing is relevant for floors as well as walls. Shown is a floor 12 provided with a combustible service penetration 5. Pillows 13 are packed around the service penetration 5. The pre-shaped pillows 13 are filled with a soft mixture of fibres and intumescent materials and simply stuffed around the penetrations 5. Pre-shaped blocks of foam may also be used, but these are typically not intumescent.

Figure 6:
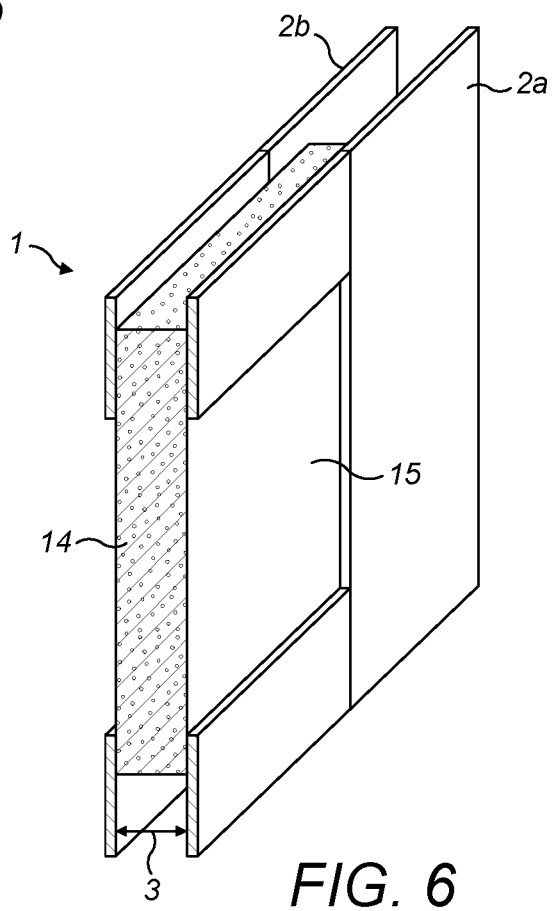
FIG. 6 shows an example of a wall panel according to the invention.

FIG. 6 shows a wall panel according to the invention. A wall 1 comprises two plasterboards 2a, 2b positioned parallel to one another in a spaced apart relationship defining a cavity 3 in which a fire-stopping material 14 comprising a reticulated foam impregnated with an intumescent agent is provided. FIG. 6 shows that a smoke barrier 15 underlies the board 2a.

Figure 7:
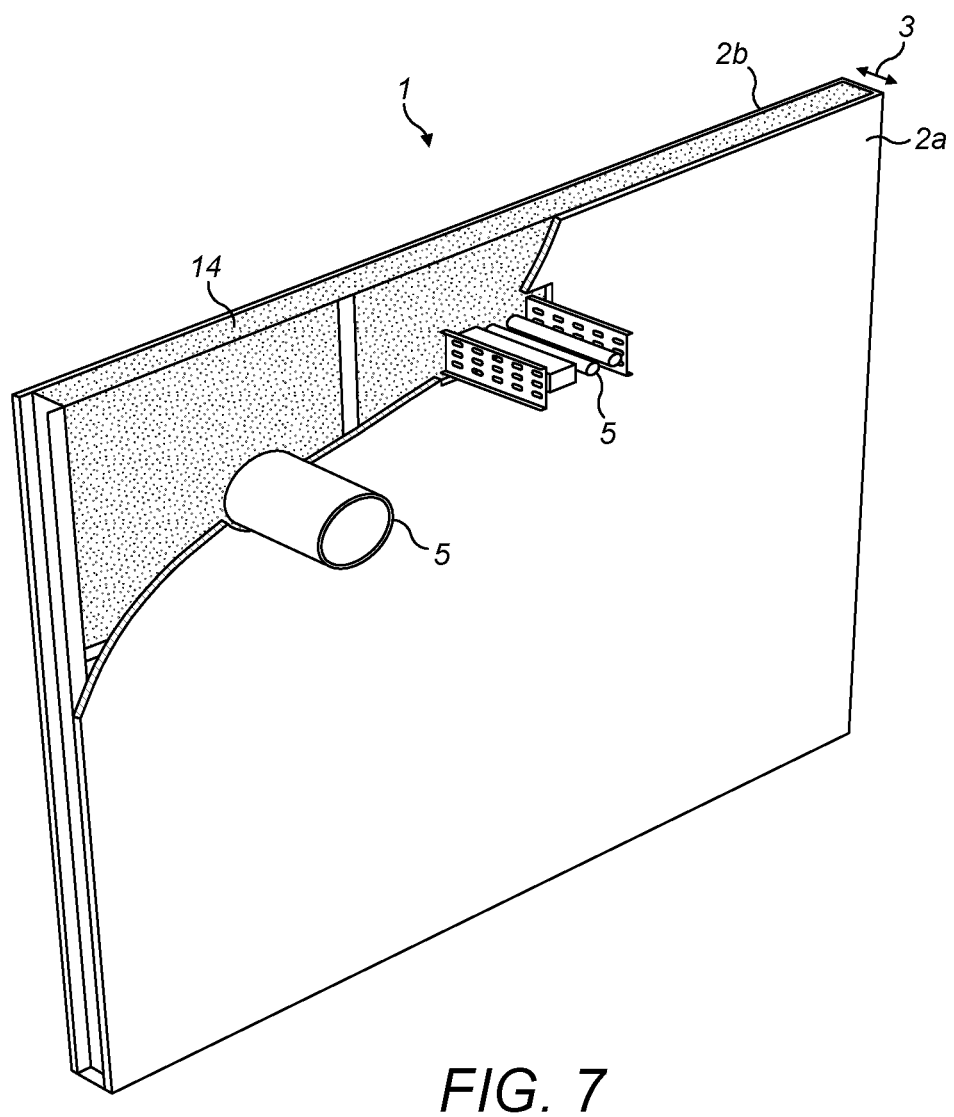
FIG. 7 shows a fire-rated wall with penetrations made fire-proof according to the invention.

When a service penetration is made through a wall according to the invention, it is much simpler to restore the fire-proofing when compared to prior art solutions. FIG. 7 shows a wall 1 according to the invention in which service penetrations 5 pass through both boards 2a, 2b to reach from one side of the wall 1 to the other. The fire-stopping material 14 that is positioned within the gap 3 between the boards 2a, 2b is resilient and therefore, even when slit to allow through passage of a service penetration 5, it springs back as far as possible to its original shape and thus large holes are prevented. The fire-stopping material 14 can be seen to be in close contact with the service penetrations 5 in FIG. 7. Only mastic (not shown) is required to restore the fire-proofing, and patching up of the smoke seal (not shown), if required. As seen in FIG. 6 and FIG. 7, the thickness of the fire-stopping material 14 is greater than the thickness of each of the boards 2a, 2b.

EXAMPLES

This test was carried out according to the general principles of EN1366-4. A 1.5 m×1.5 m×1.5 m furnace was used, with heating to the ISO834 cellulosic fire curve.

In this test, one vertical wall of the furnace is replaced with the test specimen. The furnace is then heated, and thermocouples applied to the outer surface monitor the insulation properties.

The insulation failure time is the time taken for the outer surface of the sealed area to reach (ambient temperature+ 140° C.), in this case 160° C.

The integrity of the seal is monitored visually, looking for cracks and smoke leakage through the sealed area.

A single test piece with two holes for penetrations was prepared. The test piece was a 1500 mm×1500 mm wall of 100 mm thick Thermalite shield (aerated concrete) blocks with two 200 mm×200 mm holes in the centre.

In the first case, representing the invention, one hole was sealed with a vertical 100 mm thick slab of the fire-stopping material of the invention, entirely filling the 200 mm×200 mm×100 mm space. This was then penetrated by pushing through a 10 mm diameter copper pipe.

In particular, the fire-stopping material of the invention used in this test was a PU foam impregnated with intumescent graphite and an acrylic binder.

In the second case (System-ZZ), the space between a 10 mm diameter copper pipe and the edges of the second hole was sealed with a commercially-available 2-component Polyurethane (PU) fire protection foam, System ZZ-Fire protection foam 2K NE, available from Zapp Zimmermann GmbH. This was dispensed from a cartridge and allowed to cure in the space, forming a seal.

|  | Insulation time | Integrity time |
| --- | --- | --- |
| Invention | 67 minutes | >120 minutes |
| System-ZZ | 55 minutes | >120 minutes |

This shows that the fire-stopping material of the invention is capable of being used as a commercial product with a rating of 60 minutes, and slightly out-performed the 2-component PU foam in this test.

We claim:

1. A sandwich panel for an internal building wall comprising:
   first and second boards, the first board extending lengthwise parallel to the second board and being transversely spaced apart from the second board and defining a gap therebetween extending parallel to the first and second boards, the first and second boards each defining a thickness,
   a fire-stopping material located in the gap, the fire-stopping material including a resilient, porous material at least partially filled throughout with an intumescent agent, the fire-stopping material having a thickness greater than the thickness of the first board and greater than the thickness of the second board,
   wherein the fire-stopping material is in the form of a strip with an elongate support,
   wherein the panel is configured to receive a service element extending transversely and completely through the first and second boards, and the fire-stopping material,
   wherein the service element is a pipe, a conduit or cable and being in direct contact with the fire-stopping material when extended through the first and second boards, and
   wherein the resilient, porous material comprises a polyurethane (PU) open-cell foam with a porosity of 10-100 pores per lineal inch.

2. The panel according to claim 1, wherein the intumescent agent includes at least one of: graphite, polyphosphate, melamine, pentaerythritol, titanium dioxide and exfoliated vermiculite.

3. The panel according to claim 1, wherein the intumescent agent comprises graphite.

4. The panel according to claim 1, wherein the intumescent agent comprises graphite and ammonium polyphosphate.

5. The panel according to claim 1, wherein the weight ratio of the resilient, porous material to the intumescent agent is from 1:0.2 to 1:6.

6. The panel according to claim 1, wherein the fire-stopping material of the invention is used in conjunction with a slab of insulation between the two boards.

7. The panel according to claim 6, wherein the fire-stopping material and the slab of insulation together completely fill the gap.

8. The panel according to claim 1, wherein fire-stopping material completely fills the gap.

9. The panel according to claim 1, wherein at least one major face of the fire-stopping material comprises a smoke-impermeable coating.

10. The panel according to claim 1, wherein one or both of the boards is a plasterboard.

11. The panel according to claim 1, wherein the resilient, porous material is provided with an impregnating agent comprising the intumescent agent.

12. The panel according to claim 11, wherein the impregnating agent comprises at least one liquid medium and a binder for binding solid components of the impregnating agent to the resilient, porous material.

13. The panel according to claim 12, wherein the impregnating agent is dried once impregnated into the resilient, porous material such that only traces of liquid medium remain in the resilient, porous material.

14. The panel according to claim 1, wherein the resilience of the resilient, porous material is such that, when given a compression to 50% of the original thickness, it resets to at least 75% of the original thickness.

15. The panel according to claim 1, wherein the fire-stopping material is attached to the first board such that the fire-stopping material does not completely fill the gap.

16. The panel according to claim 15, wherein the first board comprises a first main surface facing into the gap, and wherein the fire-stopping material extends lengthwise across the first board and covers the first main surface of the first board.

17. The panel according to claim 1, wherein the fire-stopping material is in the form of strips, wherein a first strip is attached to the first board, and a second strip is attached to the second board.

18. The panel according to claim 17, wherein the first board comprises a first main surface facing into the gap, and wherein the first strip extends lengthwise across the first board and covers the first main surface of the first board, and wherein the second board comprises a first main surface facing into the gap, and wherein the second strip extends lengthwise across the second board and covers the first main surface of the second board.

19. An internal building wall comprising the sandwich panel of claim 1.

* * * * *